(12) United States Patent
Yu et al.

(10) Patent No.: US 11,032,815 B2
(45) Date of Patent: Jun. 8, 2021

(54) WIRELESS COMMUNICATION METHOD AND WIRELESS COMMUNICATIONS APPARATUS

(71) Applicant: Huawei Technologies Co., Ltd., Shenzhen (CN)

(72) Inventors: Feng Yu, Beijing (CN); Bo Lin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

(21) Appl. No.: 16/672,051

(22) Filed: Nov. 1, 2019

(65) Prior Publication Data

US 2020/0068565 A1    Feb. 27, 2020

Related U.S. Application Data

(63) Continuation of application No. PCT/CN2018/085476, filed on May 3, 2018.

(30) Foreign Application Priority Data

May 4, 2017    (CN) .......................... 201710308782.9

(51) Int. Cl.
*H04W 72/04*    (2009.01)
(52) U.S. Cl.
CPC ..... *H04W 72/0426* (2013.01); *H04W 72/044* (2013.01)
(58) Field of Classification Search
CPC ..... H04W 16/12; H04W 16/14; H04W 28/04; H04W 72/0426; H04W 72/044
See application file for complete search history.

(56) References Cited

U.S. PATENT DOCUMENTS

| 2015/0078220 A1 | 3/2015 | Hu et al. |
| 2015/0237645 A1 | 8/2015 | Andrianov et al. |
| 2018/0139656 A1 | 5/2018 | Xu et al. |

FOREIGN PATENT DOCUMENTS

| CN | 101426265 A | 5/2009 |
| CN | 101801091 A | 8/2010 |
| CN | 101841860 A | 9/2010 |
| CN | 102547736 A | 7/2012 |

(Continued)

OTHER PUBLICATIONS

"Low Frequency Assisted High Frequency Operation on Initial Access," Agenda Item: 8.1.5.4, Source: Huawei, HiSilicon, Document for: Discussion and Decision, 3GPP TSG RAN WG1 Meeting #86b, R1-1609448, Lisbon, Portugal, Oct. 10-14, 2016, 5 pages.

*Primary Examiner* — Kashif Siddiqui
(74) *Attorney, Agent, or Firm* — Slater Matsil, LLP

(57) ABSTRACT

A wireless communication method and a wireless communications apparatus, the method including sending a resource request message to a second base station, where the resource request message is used to request the second base station to allocate a time-frequency resource to the first base station, receiving resource configuration information from the second base station, where the resource configuration information is used to indicate a first time-frequency resource, and the first time-frequency resource belongs to the second frequency domain resource in frequency domain, determining the first time-frequency resource based on the resource configuration information, and communicating with a terminal device by using the first time-frequency resource.

20 Claims, 5 Drawing Sheets

(56) References Cited

FOREIGN PATENT DOCUMENTS

| | | |
|---|---|---|
| CN | 103313407 A | 9/2013 |
| EP | 3076737 A1 | 10/2016 |
| WO | 2014069958 A1 | 5/2014 |
| WO | 2017005295 A1 | 1/2017 |
| WO | 2017011942 A1 | 1/2017 |

WIRELESS COMMUNICATION METHOD AND WIRELESS COMMUNICATIONS APPARATUS

CROSS-REFERENCE TO RELATED APPLICATIONS

This application is a continuation of International Application No. PCT/CN2018/085476, filed on May 3, 2018, which claims priority to Chinese Patent Application No. 201710308782.9, filed on May 4, 2017. The disclosures of the aforementioned applications are hereby incorporated herein by reference in their entireties.

TECHNICAL FIELD

This application relates to the communications field, and more specifically, to a wireless communication method and a wireless communications apparatus in the communications field.

BACKGROUND

Currently, a transmission resource in a $5^{th}$ generation (5G) new radio (NR) system is generally deployed in a 3.5G frequency band. Because a high frequency signal attenuates relatively fast and transmit power of a terminal device is relatively low in uplink transmission, an uplink coverage area of the terminal device may be affected.

To resolve a problem of a limited uplink coverage area in the 5G NR system, a time-frequency resource with relatively low frequency in a long term evolution (LTE) system may be shared with the 5G NR system. A terminal device in the 5G NR system uses the time-frequency resource with relatively low frequency to transmit data, so as to increase an uplink coverage area in the 5G NR system.

However, when the terminal device in the 5G NR system uses the time-frequency resource with relatively low frequency to transmit data, there may be a case in which the terminal device in the 5G NR system uses a transmission resource that is not shared with the LTE system by the LTE system. In other words, when the terminal device in the 5G NR system transmits data, a problem that a shared transmission resource that is allocated by the LTE system and that is used by the 5G NR system conflicts with a resource occupied by normal data transmission in the LTE system occurs.

For the foregoing problem, it is known that in the prior art, a terminal device senses both the 5G NR system and the LTE system, so as to resolve the foregoing resource conflict problem.

However, for the foregoing technical solution in the prior art, when a terminal device in the 5G NR system cannot successfully sense the LTE system, the foregoing resource conflict problem cannot be resolved by using the foregoing prior-art solution.

SUMMARY

This application provides a wireless communication method and a wireless communications apparatus, which can support resolving a resource conflict problem of time domain resources between two base stations in different communications systems.

According to a first aspect, a wireless communication method is provided, and is applied to a first base station in a communications system including at least two base stations, where the first base station performs wireless communication by using a first frequency domain resource, a second base station in the communications system performs wireless communication by using a second frequency domain resource, the first frequency domain resource does not overlap the second frequency domain resource, and the method includes sending a resource request message to the second base station, where the resource request message requests the second base station to allocate a time-frequency resource to the first base station, receiving resource configuration information sent by the second base station, where the resource configuration information is used to indicate a first time-frequency resource, and the first time-frequency resource belongs to the second frequency domain resource in frequency domain, determining the first time-frequency resource based on the resource configuration information, and communicating with a terminal device by using the first time-frequency resource.

When the terminal device cannot successfully sense a synchronization signal of the second base station, information is directly exchanged between the first base station and the second base station. Therefore, the first base station can communicate with the terminal device by using the time-frequency resource allocated by the second base station without causing a resource conflict between the first base station and the second base station.

With reference to the first aspect, in a first implementation of the first aspect, the resource configuration information is specifically used to indicate a sequence number of a first time unit corresponding to the first time-frequency resource. The first time unit includes M time units, where M≥1. The resource configuration information is further used to indicate a start location of at least one of the M time units in a time domain resource corresponding to the second base station. The determining the first time-frequency resource based on the resource configuration information includes determining, based on a sequence number of the at least one time unit and the start location of the at least one time unit in the time domain resource corresponding to the second base station, a start location of the first time unit in a time domain resource corresponding to the first base station.

The resource configuration information indicates both the sequence number of the first time unit corresponding to the first time-frequency resource and the start location of the at least one time unit in the first time unit in the time domain resource corresponding to the second base station. In this way, the first base station is enabled to determine, based on the sequence number of the at least one time unit and the start location of the at least one time unit in the time domain resource corresponding to the second base station, the start location of the first time unit that corresponds to the first time-frequency resource and that is in the time domain resource corresponding to the first base station. Therefore, the first base station can communicate with the terminal device by using the time-frequency resource allocated by the second base station without causing a resource conflict between the first base station and the second base station.

With reference to the first aspect and the foregoing implementation of the first aspect, in a second implementation of the first aspect, the method includes receiving first resource reference information sent by the second base station, where the first resource reference information is used to indicate a sequence number of a second time unit and a start location of the second time unit in the time domain resource corresponding to the second base station, and the determining the first time-frequency resource based on the resource configuration information includes determining, based on the sequence number of the second time unit and the start location of the second time unit in the time domain resource corresponding to the second base station, the start location of the first time unit in the time domain resource corresponding to the first base station.

The first base station receives the first resource reference information sent by the second base station, and the first resource reference information indicates both the sequence number of the second time unit and the start location of the second time unit in the time domain resource corresponding to the second base station. In this way, the first base station is enabled to determine, based on the sequence number of the second time unit and the start location of the second time unit in the time domain resource corresponding to the second base station, the start location of the first time unit that corresponds to the first time-frequency resource and that is in the time domain resource corresponding to the first base station. Therefore, the first base station can communicate with the terminal device by using the time-frequency resource allocated by the second base station without causing a resource conflict between the first base station and the second base station.

With reference to the first aspect and the foregoing implementations of the first aspect, in a third implementation of the first aspect, the determining the first time-frequency resource based on the resource configuration information includes sending second resource reference information to the second base station, where the second resource reference information is used to indicate a sequence number of a third time unit and a start location of the third time unit in the time domain resource corresponding to the first base station, receiving third resource reference information sent by the second base station, where the third resource reference information is used to indicate a start location offset, the start location offset is a time difference between the start location of the third time unit and a start location of a fourth time unit, and the fourth time unit is any time unit in the time domain resource corresponding to the second base station, and determining, based on the start location offset, the start location of the first time unit in the time domain resource corresponding to the first base station.

The first base station indicates, to the second base station, the sequence number of the third time unit and the start location of the third time unit in the time domain resource corresponding to the first base station. The second base station indicates the start location offset to the first base station, and the start location offset is the time difference between the start location of the third time unit and the start location of the fourth time unit. In this way, the first base station is finally enabled to determine, based on the start location offset, the start location of the first time unit that corresponds to the first time-frequency resource and that is in the time domain resource corresponding to the first base station. Therefore, the first base station can communicate with the terminal device by using the time-frequency resource allocated by the second base station without causing a resource conflict between the first base station and the second base station.

With reference to the first aspect and the foregoing implementations of the first aspect, in a fourth implementation of the first aspect, the second resource reference information and the resource request message are same information, and/or the first resource reference information and the resource configuration information are same information, and/or the third resource reference information and the resource configuration information are same information.

With reference to the first aspect and the foregoing implementations of the first aspect, in a fifth implementation of the first aspect, the first time unit is a frame, the sequence number of the first time unit is a frame number, the second time unit is a frame, the sequence number of the second time unit is a frame number, the third time unit is a frame, and the sequence number of the third time unit is a frame number, or the first time unit is a subframe, the sequence number of the first time unit is a subframe number, the second time unit is a subframe, the sequence number of the second time unit is a subframe number, the third time unit is a subframe, and the sequence number of the third time unit is a subframe number.

With reference to the first aspect and the foregoing implementations of the first aspect, in a sixth implementation of the first aspect, the method further includes sending first indication information to the terminal device, where the first indication information is used to indicate the first time-frequency resource.

With reference to the first aspect and the foregoing implementations of the first aspect, in a seventh implementation of the first aspect, the method further includes receiving resource reconfiguration information sent by the second base station, where the resource reconfiguration information is used to indicate a time-frequency resource that is reallocated by the second base station to the first base station, and sending second indication information to the terminal device, where the second indication information is used to indicate the time-frequency resource that is reallocated by the second base station to the first base station.

The resource reconfiguration information indicates, to the first base station, the time-frequency resource that is reallocated by the second base station to the first base station. In this way, the first base station is enabled to re-determine, based on the resource reconfiguration information, the time-frequency resource reallocated by the second base station. Therefore, the first base station can communicate with the terminal device by using the time-frequency resource reallocated by the second base station without causing a resource conflict.

With reference to the first aspect and the foregoing implementations of the first aspect, in an eighth implementation of the first aspect, the first base station is a gNB in a 5G NR system, and the second base station is an eNB in an LTE system.

According to a second aspect, a wireless communication method is provided, and is applied to a second base station in a communications system including at least two base stations, where a first base station in the communications system performs wireless communication by using a first frequency domain resource, the second base station performs wireless communication by using a second frequency domain resource, the first frequency domain resource does not overlap the second frequency domain resource, and the method includes receiving a resource request message sent by the first base station, where the resource request message requests the second base station to allocate a time-frequency resource to the first base station, determining a first time-frequency resource based on the resource request message, and sending resource configuration information to the first base station, where the resource configuration information is used to indicate the first time-frequency resource, and the first time-frequency resource belongs to the second frequency domain resource in frequency domain.

When a terminal device cannot successfully sense a synchronization signal of the second base station, information is directly exchanged between the first base station and the second base station. Therefore, the first base station can communicate with the terminal device by using the time-frequency resource allocated by the second base station without causing a resource conflict between the first base station and the second base station.

With reference to the second aspect, in a first implementation of the second aspect, the resource configuration information is specifically used to indicate a sequence number of a first time unit corresponding to the first time-frequency resource. The first time unit includes M time units, where M≥1. The resource configuration information is further used to indicate a start location of at least one of the M time units in a time domain resource corresponding to the second base station.

The resource configuration information indicates both the sequence number of the first time unit corresponding to the first time-frequency resource and the start location of the at least one time unit in the first time unit in the time domain resource corresponding to the second base station. In this way, the first base station is enabled to determine, based on a sequence number of the at least one time unit and the start location of the at least one time unit in the time domain resource corresponding to the second base station, a start location of the first time unit that corresponds to the first time-frequency resource and that is in a time domain resource corresponding to the first base station. Therefore, the first base station can communicate with the terminal device by using the time-frequency resource allocated by the second base station without causing a resource conflict between the first base station and the second base station.

With reference to the second aspect and the foregoing implementation of the second aspect, in a second implementation of the second aspect, the method further includes sending first resource reference information to the first base station, where the first resource reference information is used to indicate a sequence number of a second time unit and a start location of the second time unit in the time domain resource corresponding to the second base station.

The first base station receives the first resource reference information sent by the second base station, and the first resource reference information indicates both the sequence number of the second time unit and the start location of the second time unit in the time domain resource corresponding to the second base station. In this way, the first base station is enabled to determine, based on the sequence number of the second time unit and the start location of the second time unit in the time domain resource corresponding to the second base station, the start location of the first time unit that corresponds to the first time-frequency resource and that is in the time domain resource corresponding to the first base station. Therefore, the first base station can communicate with the terminal device by using the time-frequency resource allocated by the second base station without causing a resource conflict between the first base station and the second base station.

With reference to the second aspect and the foregoing implementations of the second aspect, in a third implementation of the second aspect, the method further includes receiving second resource reference information sent by the first base station, where the second resource reference information is used to indicate a sequence number of a third time unit and a start location of the third time unit in the time domain resource corresponding to the first base station, and sending third resource reference information to the first base station, where the third resource reference information is used to indicate a start location offset, the start location offset is a time difference between the start location of the third time unit and a start location of a fourth time unit, and the fourth time unit is a time unit in the time domain resource corresponding to the second base station.

The first base station indicates, to the second base station, the sequence number of the third time unit and the start location of the third time unit in the time domain resource corresponding to the first base station. The second base station indicates the start location offset to the first base station, and the start location offset is the time difference between the start location of the third time unit and the start location of the fourth time unit. In this way, the first base station is finally enabled to determine, based on the start location offset, the start location of the first time unit that corresponds to the first time-frequency resource and that is in the time domain resource corresponding to the first base station. Therefore, the first base station can communicate with the terminal device by using the time-frequency resource allocated by the second base station without causing a resource conflict between the first base station and the second base station.

With reference to the second aspect and the foregoing implementations of the second aspect, in a fourth implementation of the second aspect, the second resource reference information and the resource request message are same information, and/or the first resource reference information and the resource configuration information are same information, and/or the third resource reference information and the resource configuration information are same information.

With reference to the second aspect and the foregoing implementations of the second aspect, in a fifth implementation of the second aspect, the first time unit is a frame, the sequence number of the first time unit is a frame number, the second time unit is a frame, the sequence number of the second time unit is a frame number, the third time unit is a frame, and the sequence number of the third time unit is a frame number, or the first time unit is a subframe, the sequence number of the first time unit is a subframe number, the second time unit is a subframe, the sequence number of the second time unit is a subframe number, the third time unit is a subframe, and the sequence number of the third time unit is a subframe number.

With reference to the second aspect and the foregoing implementations of the second aspect, in a sixth implementation of the second aspect, the method further includes sending resource reconfiguration information to the first base station, where the resource reconfiguration information is used to indicate a time-frequency resource that is reallocated by the second base station to the first base station.

The resource reconfiguration information indicates, to the first base station, the time-frequency resource that is reallocated by the second base station to the first base station. In this way, the first base station is enabled to re-determine, based on the resource reconfiguration information, the time-frequency resource reallocated by the second base station. Therefore, the first base station can communicate with the terminal device by using the time-frequency resource reallocated by the second base station without causing a resource conflict between the first base station and the second base station.

With reference to the second aspect and the foregoing implementations of the second aspect, in a seventh implementation of the second aspect, the first base station is a gNB in a 5G NR system, and the second base station is an eNB in an LTE system.

According to a third aspect, a wireless communications apparatus is provided. The apparatus may be a first base station, or may be a chip inside the first base station. The apparatus may include a processing unit and a transceiver unit. When the apparatus is the first base station, the processing unit may be a processor, and the transceiver unit may be a transceiver. The first base station may further include a storage unit, and the storage unit may be a memory. The storage unit is configured to store an instruction, and the processing unit executes the instruction stored in the storage unit, so that the first base station performs the wireless communication method in any one of the first aspect and the implementations of the first aspect. When the apparatus is the chip inside the first base station, the processing unit may be a processor, and the transceiver unit may be an input/output interface, a pin, a circuit, or the like. The processing unit executes an instruction stored in a storage unit, so that the first base station performs the wireless communication method in any one of the first aspect and the implementations of the first aspect. The storage unit may be a storage unit (such as a register or a cache) inside the chip, or may be a storage unit (such as a read-only memory or a random access memory) inside the first base station and outside the chip.

According to a fourth aspect, an embodiment of this application provides a wireless communications apparatus. The apparatus may be a second base station, or may be a chip inside the second base station. The apparatus may include a processing unit and a transceiver unit. When the apparatus is the second base station, the processing unit may be a processor, and the transceiver unit may be a transceiver. The second base station may further include a storage unit, and the storage unit may be a memory. The storage unit is configured to store an instruction, and the processing unit executes the instruction stored in the storage unit, so that the second base station performs the wireless communication method in any one of the second aspect and the implementations of the second aspect. When the apparatus is the chip inside the second base station, the processing unit may be a processor, and the transceiver unit may be an input/output interface, a pin, a circuit, or the like. The processing unit executes an instruction stored in a storage unit, so that the second base station performs the wireless communication method in any one of the second aspect and the implementations of the second aspect. The storage unit may be a storage unit (such as a register or a cache) inside the chip, or may be a storage unit (such as a read-only memory or a random access memory) inside the second base station and outside the chip.

According to a fifth aspect, an embodiment of this application provides a wireless communications apparatus. The apparatus includes a processor and a storage medium. The storage medium stores an instruction, and when the instruction is run by the processor, the processor is enabled to execute the wireless communication method in any one of the first aspect and the implementations of the first aspect. The apparatus may be a chip or a chip system.

According to a sixth aspect, an embodiment of this application provides a wireless communications apparatus. The apparatus includes a processor and a storage medium. The storage medium stores an instruction, and when the instruction is run by the processor, the processor is enabled to execute the wireless communication method in any one of the second aspect and the implementations of the second aspect. The apparatus may be a chip or a chip system.

According to a seventh aspect, a computer program product is provided, and the computer program product includes computer program code. When the computer program code is run by a processing unit and a communications unit or a processor and a transceiver of a network device, a terminal device is enabled to perform the wireless communication method in any one of the first aspect and the implementations of the first aspect.

According to an eighth aspect, a computer program product is provided, and the computer program product includes computer program code. When the computer program code is run by a communications unit and a processing unit or a transceiver and a processor of a terminal device, a network device is enabled to perform the wireless communication method in any one of the second aspect and the implementations of the second aspect.

According to a ninth aspect, a computer-readable storage medium is provided. The computer-readable storage medium stores a program, and the program enables a terminal device to perform the wireless communication method in any one of the first aspect and the implementations of the first aspect.

According to a tenth aspect, a computer-readable storage medium is provided. The computer-readable storage medium stores a program, and the program enables a network device to perform the wireless communication method in any one of the second aspect and the implementations of the second aspect.

According to an eleventh aspect, a communications system is provided. The communications system includes the first base station in the third aspect and the second base station in the fourth aspect.

DETAILED DESCRIPTION OF ILLUSTRATIVE EMBODIMENTS

Figure 1:
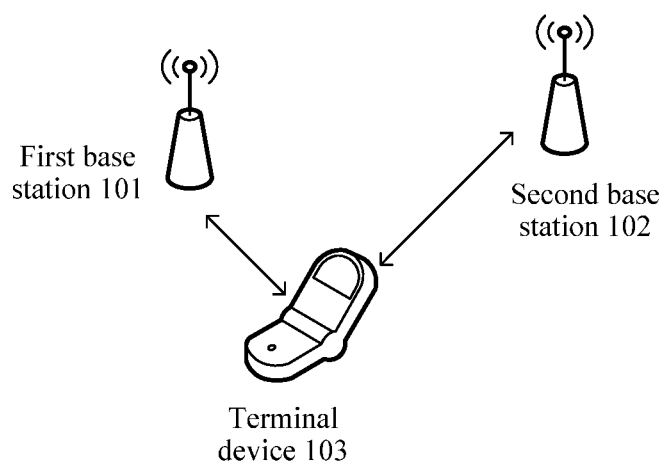
FIG. 1 is a schematic architectural diagram of a communications system according to this application.

The following describes technical solutions of this application with reference to the accompanying drawings.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that the technical solutions of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, a universal mobile telecommunications system (UMTS), or a next-generation communications system.

A next-generation mobile communications system supports not only conventional communication, but also machine-to-machine (M2M) communication or vehicle to vehicle (V2V) communication. The M2M communication may also be referred to as machine type communication (MTC).

This application describes the embodiments with reference to a terminal device. The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless telephone set, a session initiation protocol (SIP) phone, a wireless local loop (WLL) station, a personal digital assistant (PDA) device, a handheld device having a wireless communication function, a computing device or another processing device connected to a wireless modulation encoder, a vehicle-mounted device, a wearable device, a terminal device in a next-generation communications system such as a 5th generation (5G) communications network, or a terminal device in a future evolved public land mobile network (PLMN).

In addition, this application describes the embodiments with reference to a network device. The network device may be a device configured to communicate with a mobile device. The network device may be an access point (AP) in a WLAN, or a base transceiver station (BTS) in GSM or CDMA, or may be a NodeB (NB) in WCDMA, or further may be an evolutional NodeB (eNB or eNodeB) in LTE, or a relay node or an access point, or a vehicle-mounted device, a wearable device, a network device in a future 5G network, a network device in a future evolved PLMN network, or the like.

A method and an apparatus that are provided in this application may be applied to the terminal device or the network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software. Moreover, in this application, a specific structure of an entity for performing a wireless communication method is not particularly limited in this application, provided that the entity can run a program recording code of the wireless communication method in this application, to perform communication by using the wireless communication method in this application. For example, the wireless communication method in this application may be performed by the terminal device, the network device, or a functional module that is in the terminal device or the network device and that can invoke and execute the program.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 is a schematic diagram of a communications system applicable to a wireless communication method and a wireless communications apparatus of this application. As shown in FIG. 1, the communications system 100 includes a first base station 101, a second base station 102, and a terminal device 103. The second base station 101 exchanges information with the first base station 102 through an $X_2$, so as to determine start locations of time domain resources of the first base station 101 and the second base station 102, and further determine a difference between the start locations of the time domain resources of the first base station 101 and the second base station 102. The first base station 101 notifies the terminal device 103 of the difference between the start locations, and communicates with the terminal device 103.

It should be noted that the communications system 100 is merely an example for understanding the technical solutions of this application, and a quantity of devices in the system is not excessively limited in this application. For example, there may be one or more terminal devices in this application.

Figure 2A:
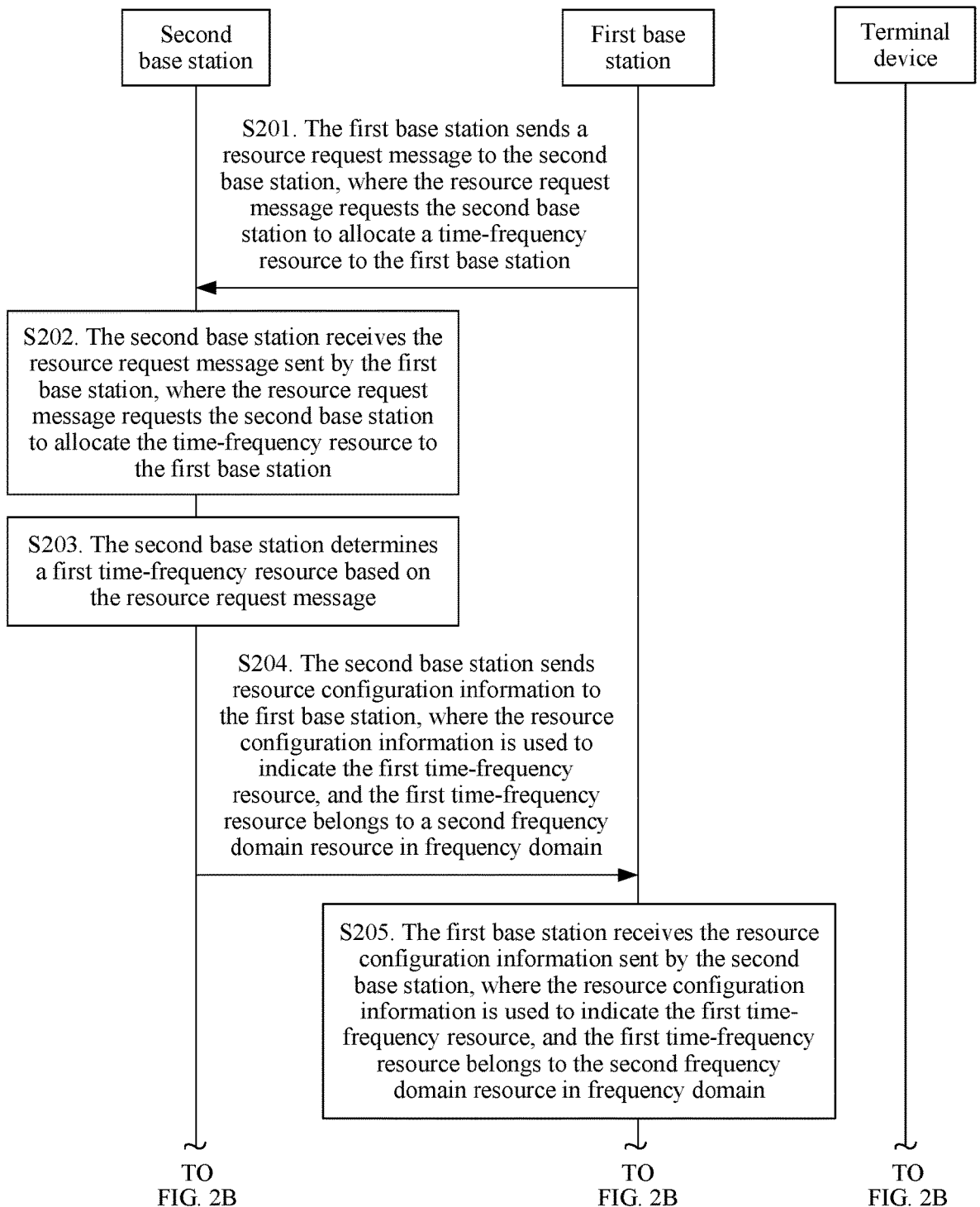
FIG. 2A and FIG. 2B are a schematic interaction diagram of a wireless communication method according to this application.
Figure 2B:
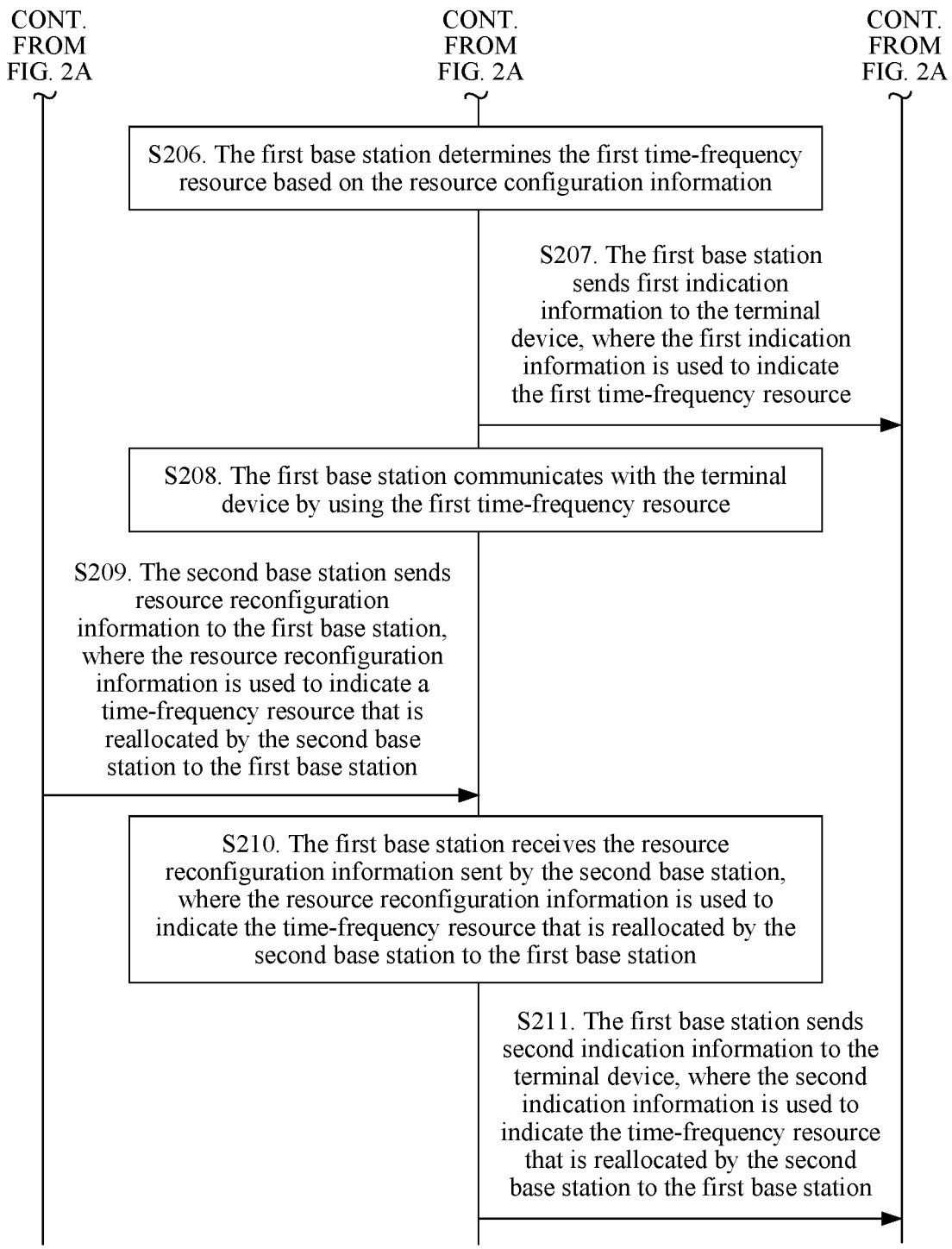

FIG. 2A and FIG. 2B show a schematic flowchart of a wireless communication method 200 according to this application. In FIG. 2, a first base station may be the first base station 101 in FIG. 1, a second base station may be the second base station 102 in FIG. 1, and a terminal device may be the terminal device 103 in FIG. 1. Certainly, in an actual system, quantities of first base stations, second base stations, and terminal devices may not be limited to an example in this embodiment or another embodiment. Details are not described below again. As shown in FIG. 2, the method 200 is applied to a communications system including at least two base stations. The first base station in the at least two base stations performs wireless communication by using a first frequency domain resource. The second base station in the at least two base stations performs wireless communication by using a second frequency domain resource. The first frequency domain resource does not overlap the second frequency domain resource. The method 200 includes the following steps.

S201. The first base station sends a resource request message to the second base station, where the resource request message requests the second base station to allocate a time-frequency resource to the first base station.

S202. The second base station receives the resource request message sent by the first base station, where the resource request message requests the second base station to allocate the time-frequency resource to the first base station.

S203. The second base station determines a first time-frequency resource based on the resource request message.

Specifically, the first base station communicates by using the first frequency domain resource, for example, the first frequency domain resource is a frequency domain resource whose center frequency is 3.5 GHz and whose frequency bandwidth is 100 MHz. The second base station communicates by using the second frequency domain resource, for example, the second frequency domain resource is a frequency domain resource whose center frequency is 1.8 GHz and whose frequency bandwidth is 20 MHz. It may be learned that no overlapping area exists between the first frequency domain resource and the second frequency domain resource.

In step S201 to step S203, the first base station sends the resource request message to the second base station, and the resource request message is used to request the second base station to allocate the time-frequency resource to the first base station. When receiving the resource request message sent by the first base station, the second base station determines, based on the resource request message, that the first base station requests a time-frequency resource from the second base station, and then determines the first time-frequency resource, where the first time-frequency resource is a transmission resource allocated by the second base station to the first base station.

S204. The second base station sends resource configuration information to the first base station, where the resource configuration information is used to indicate the first time-frequency resource, and the first time-frequency resource belongs to the second frequency domain resource in frequency domain.

Specifically, after determining the first time-frequency resource to be allocated to the first base station, the second base station sends the resource configuration information to the first base station in step S204. The resource configuration information is used to indicate the first time-frequency resource to the first base station, and the first time-frequency resource belongs to the second frequency domain resource in frequency domain. To be specific, the first time-frequency resource is a frequency domain resource whose corresponding frequency domain resource is 1.8 GHz and whose frequency bandwidth is 20 MHz.

S205. The first base station receives the resource configuration information sent by the second base station, where the resource configuration information is used to indicate the first time-frequency resource, and the first time-frequency resource belongs to the second frequency domain resource in frequency domain.

S206. The first base station determines the first time-frequency resource based on the resource configuration information.

In step S205 and step S206, the first base station receives the resource configuration information sent by the second base station, and determines, based on the resource configuration information, the first time-frequency resource allocated by the second base station.

It should be noted that a cause of a conflict between the foregoing resources may be that a start location of a time domain resource in the second base station is not aligned with a start location of a time domain resource with a same sequence number in the first base station, and consequently, the first base station uses a transmission resource in the second base station that is not allocated to the first base station. Therefore, the foregoing resource conflict problem can be resolved by aligning the start location of the time domain resource in the second base station with the start location of the time domain resource with the same sequence number in the first base station.

In this application, the first base station may determine, based on the resource configuration information, a start location of the first time-frequency resource in a time domain resource corresponding to the first base station (in other words, the start location of the first time-frequency resource in the time domain resource corresponding to the first base station is aligned with a start location of the first time-frequency resource in a time domain resource corresponding to the second base station), so as to resolve the foregoing resource conflict problem.

The following describes in detail several cases in which after receiving the resource configuration information sent by the second base station, the first base station determines, based on the resource configuration information, the start location of the first time-frequency resource in the time domain resource corresponding to the first base station.

Case 1

Case 1 is used as an example rather than a limitation. The resource configuration information is specifically used to indicate a sequence number of a first time unit corresponding to the first time-frequency resource. The first time unit includes M time units, where M≥1. The resource configuration information is further used to indicate a start location of at least one of the M time units in the time domain resource corresponding to the second base station. That the first base station determines the first time-frequency resource based on the resource configuration information includes the first base station determines, based on a sequence number of the at least one time unit and the start location of the at least one time unit in the time domain resource corresponding to the second base station, a start location of the first time unit in the time domain resource corresponding to the first base station.

Specifically, the resource configuration information sent by the second base station to the first base station indicates, to the second base station, a sequence number corresponding to the first time-frequency resource. For example, the first time unit may be a frame or a subframe, and the sequence number of the first time unit is a frame number or a subframe number. The first time unit includes the M time units, where M≥1. The resource configuration information is further used to indicate the start location of at least one of the M time units in the time domain resource corresponding to the second base station.

After receiving the resource configuration information, the first base station determines, based on the frame number or the subframe number that is indicated by the resource configuration information, the first time-frequency resource allocated by the second base station. For example, the frame number indicated by the resource configuration information is a frame 1 or a subframe 5 of the frame 1, a frame 2 or a subframe 3 of the frame 2, a frame 4 or a subframe 6 of the frame 4, and a frame 5 or a subframe 4 of the frame 5. The first base station further determines, based on a start location that is of at least one frame in the time domain resource corresponding to the second base station and that is indicated by the resource configuration information, the start location of the first time-frequency resource in the time domain resource corresponding to the first base station.

For example, the resource configuration information indicates a start location of the frame 5 or the subframe 4 of the frame 5 in the time domain resource corresponding to the second base station, and the start location may be time information corresponding to a frame boundary of the frame 5 (for example, the time information is 09:16:42:36:03). The first base station determines, based on the resource configuration information with reference to a start location of a frame with a same frame number in the time domain resource corresponding to the first base station, a start location offset of two frames with same frame numbers (that is, calculates a time difference between start locations of two frames with same frame numbers or two subframes with same subframe numbers), further determines, based on the start location offset, start locations of all frames or subframes that are included in the first time-frequency resource and that are in the time domain resource corresponding to the first base station, and finally communicates with the terminal device by using the first time-frequency resource.

It should be noted that, in case 1, the resource request message may be only used to request the second base station to allocate the time-frequency resource to the first base station, and does not indicate, to the second base station, the sequence number of the at least one time unit and a start location of the at least one time unit in the time domain resource corresponding to the first base station.

It should be further noted that when the transmission resource allocated by the second base station to the first base station is a subframe, in addition to indicating, to the first base station, a subframe number corresponding to the transmission resource, the second base station further needs to indicate, to the first base station, a frame number and a start location that are of a frame in which a subframe corresponding to the subframe number is located, alternatively, in addition to indicating, to the first base station, a subframe number corresponding to the transmission resource, the second base station further needs to indicate, to the first base station, a start location offset between a subframe corresponding to the subframe number and a reference subframe corresponding to a reference subframe number. The reference subframe number is a subframe number that is indicated by the resource configuration information to the first base station and that is corresponding to the time domain resource of the second base station.

It should be further noted that, in case 1, for the sequence number of the at least one time unit and the start location of the at least one time unit in the time domain resource corresponding to the second base station that are indicated by the second base station to the first base station by using the resource configuration information, when the at least one time unit is a frame or a subframe, the start location of the at least one time unit in the time domain resource corresponding to the second base station is time information corresponding to a frame boundary or time information corresponding to a subframe boundary. For example, the second base station indicates, to the first base station, a frame 6 and time information corresponding to a frame boundary of the frame 6. The time information corresponding to the frame boundary of the frame 6 may be 19:20:50:08:06.

Case 2

Case 2 is used as an example rather than a limitation. The method further includes the first base station receives first resource reference information sent by the second base station. The first resource reference information is used to indicate a sequence number of a second time unit. The first resource reference information is further used to indicate a start location of the second time unit in the time domain resource corresponding to the second base station. That the first base station determines the first time-frequency resource based on the resource configuration information includes the first base station determines, based on the sequence number of the second time unit and the start location of the second time unit in the time domain resource corresponding to the second base station, a start location of the first time unit in the time domain resource corresponding to the first base station.

Specifically, the first base station determines, based on the received resource configuration information, a frame number or a subframe number that is allocated by the second base station to the first base station. In addition, the first base station receives the first resource reference information sent by the second base station, and the first resource reference information indicates, to the first base station, the sequence number of the second time unit and the start location of the second time unit in the time domain resource corresponding to the second base station.

For example, the second base station indicates a start location of a frame 8 to the first base station by using the first resource reference information. For example, when the second base station indicates, to the first base station, that time information corresponding to a frame boundary of the frame 8 is 15:16:33:10:16, the first base station determines, based on the indication of the first resource reference information, a start location of a frame or a subframe that is indicated by the resource configuration information.

It should be noted that the first resource reference information and the resource configuration information may be separately sent to the first base station, and the first resource reference information and the resource configuration information respectively indicate different information to the first base station. Alternatively, the first resource reference information and the resource configuration information may be carried in a same piece of information (that is, the first resource reference information and the resource configuration information are same information) and sent to the first base station. For example, the resource configuration information indicates, to the first base station, a frame number or a subframe number that is corresponding to the first time-frequency resource, and further indicates, to the first base station, a start location of a frame or a subframe.

It should be further noted that the frame or the subframe corresponding to the start location indicated by the second base station to the first base station may be a frame or a subframe that is included in the first time-frequency resource (which is consistent with the technical solution described in case 1). Alternatively, the frame or the subframe corresponding to the start location indicated by the second base station to the first base station may be a frame or a subframe outside the first time-frequency resource. This is not limited in this application.

It should be further noted that, in case 2, for the sequence number of the second time unit and the start location of the second time unit in the time domain resource corresponding to the second base station that are indicated by the second base station to the first base station by using the first resource reference information, when the second time unit is a frame or a subframe, the start location of the second time unit in the time domain resource corresponding to the second base station is time information corresponding to a frame boundary or time information corresponding to a subframe boundary. For example, the second base station indicates, to the first base station, the frame 8 and time information corresponding to a frame boundary of the frame 8. The time information corresponding to the frame boundary of the frame 8 may be 22:36:46:10:08.

Case 3

That the first base station determines the first time-frequency resource based on the resource configuration information includes the following. The first base station sends second resource reference information to the second base station. The second resource reference information is used to indicate a sequence number of a third time unit. The second resource reference information is further used to indicate a start location of the third time unit in the time domain resource corresponding to the first base station. The first base station is a timing system used by the first base station. The first base station receives third resource reference information sent by the second base station. The third resource reference information is used to indicate a start location offset. The start location offset is a time difference between the start location of the third time unit and a start location of a fourth time unit. The fourth time unit is a time unit in the time domain resource corresponding to the second base station. The first base station determines, based on the start location offset, a start location of the first time unit in the time domain resource corresponding to the first base station.

Specifically, the first base station sends the resource request message to the second base station. The resource request message is used to request the second base station to allocate the first time-frequency resource. In addition, the first base station sends the second resource reference information to the second base station. The second resource reference information is used to indicate the sequence number of the third time unit and the start location of the third time unit in the time domain resource corresponding to the first base station.

The first base station receives the third resource reference information sent by the second base station. The third resource reference information is used to indicate the start location offset, and the start location offset is determined by the second base station based on the second resource reference information. The second base station determines the start location offset based on the sequence number of the third time unit and the start location of the third time unit in the time domain resource corresponding to the first base station that are indicated by the second resource reference information.

For example, the third time unit is a frame or a subframe, the fourth time unit is a frame or a subframe, and the first base station indicates a start location of a frame 6 in the first base station to the second base station by using the second resource reference information. The second base station first needs to determine, in a corresponding time domain resource, a start location of a frame corresponding to the fourth time unit. A frame number of the frame corresponding to the fourth time unit may be a frame 6 in the time domain resource corresponding to the second base station (that is, a frame with the same frame number in the same period as that of the third time unit). Alternatively, a frame number of the frame corresponding to the fourth time unit may be a sequence number of the $1^{st}$ time unit in M time units that are in the same period as the third time unit and that are included in the first time unit (for example, a frame number of a frame corresponding to the $1^{st}$ time unit is a frame 3). To be specific, the start location offset may be a start location offset of frames with a same frame number in the first base station and the second base station. Alternatively, the start location offset may be a start location offset between the first frame or the first subframe of M frames or subframes that are allocated by the second base station to the first base station and a frame or a subframe corresponding to the third time unit.

The start location offset may further be a start location offset between the first frame or the first subframe of M frames or subframes that are allocated by the second base station to the first base station (for example, an example of the fourth time unit) and a frame or a subframe corresponding to a preset frame number or subframe number in the first base station (for example, the preset frame number or subframe number in the first base station may be a frame number or a subframe number that is specified by a system). A start location of the preset frame or subframe in the first base station is determined by the second base station based on the start location of the frame corresponding to the third time unit or the start location of the subframe corresponding to the third time unit.

After determining a time difference (that is, a start location offset) between the start locations of the frame corresponding to the third time unit and the frame corresponding to the fourth time unit, the second base station sends the third resource reference information to the first base station. The third resource reference information is used to indicate the start location offset to the second base station. The first base station further determines, based on the start location offset, a start location of a frame or a subframe that is included in the first time-frequency resource.

It should be noted that the first base station may separately send the second resource reference information and the resource request message to the second base station, and the second resource reference information and the resource request message respectively indicate different information to the second base station. Alternatively, the second resource reference information and the resource request message may be carried in a same piece of information (that is, the second resource reference information and the resource request message are same information), and sent by the first base station to the second base station. For example, the resource request message is used to request the second base station to allocate a time-frequency resource, and is also used to indicate, to the second base station, the sequence number of the third time unit and the start location of the third time unit in the time domain resource corresponding to the first base station. This is not limited in this application.

It should be further noted that the second base station may separately send the third resource reference information and the resource configuration information to the first base station, and the third resource reference information and the resource configuration information respectively indicate different information to the first base station. Alternatively, the third resource reference information and the resource configuration information may be carried in a same piece of information, and sent by the second base station to the first base station. This is not limited in this application.

It should be further noted that the second base station sends the third resource reference information to the first base station. The third resource reference information may indicate the foregoing start location offset to the first base station. Alternatively, the third resource reference information may indicate, to the first base station, a sequence number corresponding to the fourth time unit and a start location of the fourth time unit in the time domain resource corresponding to the second base station. The frame number of the frame corresponding to the fourth time unit or a subframe number of a subframe corresponding to the fourth time unit is the same as or different from the frame number of the frame corresponding to the third time unit or the subframe number of the subframe corresponding to the third time unit. This is not limited in this application.

It should be further noted that, in case 3, for the sequence number of the third time unit and the start location of the third time unit in the time domain resource corresponding to the first base station that are indicated by the first base station to the second base station by using the second resource reference information, when the third time unit is a frame or a subframe, the start location of the third time unit in the time domain resource corresponding to the first base station is time information corresponding to a frame boundary or time information corresponding to a subframe boundary. For example, the first base station indicates, to the second base station, a frame 2 and time information corresponding to a frame boundary of the frame 2. The time information corresponding to the frame boundary of the frame 2 may be 18:30:26:13:10.

It should be understood that the foregoing description is merely provided by using the first time unit as a frame or a subframe, using the second time unit as a frame or a subframe, and using the third time unit as a frame or a subframe. However, this application is not limited thereto. The first time unit, the second time unit, and the third time unit may be other time domain resources, for example, the first time unit, the second time unit, and the third time unit may be slots or OFDM symbols (OS). This is not limited in this application.

The foregoing describes several cases in which the first base station determines the first time-frequency resource. The following describes steps performed by the first base station after the first time-frequency resource is determined.

S207. The first base station sends first indication information to the terminal device, where the first indication information is used to indicate the first time-frequency resource.

S208. The first base station communicates with the terminal device by using the first time-frequency resource.

Specifically, after determining the first time-frequency resource allocated by the second base station, the first base station needs to send the first indication information to the terminal device. The first indication information is used to indicate the first time-frequency resource to the terminal device, so that the first base station communicates with the terminal device by using the first time-frequency resource.

For example, the first indication information is used to indicate a frame number or a subframe number that is allocated by the second base station, and the first indication information is further used to indicate a time difference of start locations of frames with a same frame number or subframes with a same subframe number that are between the first base station and the second base station, so that the terminal device determines, based on the indication information, a time-frequency resource used when the terminal device communicates with the first base station.

For another example, the first indication information is used to indicate a frame number or a subframe number that is allocated by the second base station, and the first indication information is further used to indicate a start location of any frame or any subframe of the second base station, so that the terminal device calculates, based on the first indication information, a difference between frames with a same frame number or subframes with a same subframe number that are between the first base station and the second base station, and determines a time-frequency resource used for communication with the first base station.

When sending the first indication information to the terminal device, the first base station may use a system message, radio resource control (RRC) signaling, a media access control (MAC) control element (MAC CE), or the like. This is not limited in this application.

S209. The second base station sends resource reconfiguration information to the first base station, where the resource reconfiguration information is used to indicate a time-frequency resource that is reallocated by the second base station to the first base station.

Specifically, after the second base station allocates the first time-frequency resource to the first base station, when load of the second base station increases, or a start location of a frame or a subframe of the second base station changes due to clock drift, the second base station needs to adjust the time-frequency resource allocated to the second base station.

The foregoing description is used as an example rather than a limitation. For example, when a quantity of terminal devices that perform uplink transmission with the second base station increases (that is, the load of the second base station increases), the first base station sends resource configuration information to the second base station. The resource configuration information indicates the time-frequency resource that is reallocated by the second base station to the first base station (for example, a frequency domain resource of the time-frequency resource is a frequency domain resource whose center frequency is 1.8 GHz and a frequency bandwidth is 50 MHz, and a time domain resource of the time-frequency resource is a frame 5 or a subframe 8).

For another example, when the load of the second base station increases, a start location of a frame or a subframe of the second base station is enabled to change due to clock drift. In this case, the second base station sends resource configuration information to the first base station. The resource configuration information indicates not only a time-frequency resource reallocated by the second base station to the first base station, but also a time difference between frames with a same frame number or subframes with a same subframe number between the first base station and the second base station.

S210. The first base station receives the resource reconfiguration information sent by the second base station, where the resource reconfiguration information is used to indicate the time-frequency resource that is reallocated by the second base station to the first base station.

S211. The first base station sends second indication information to the terminal device, where the second indication information is used to indicate the time-frequency resource that is reallocated by the second base station to the first base station.

Specifically, the first base station receives the resource configuration information sent by the second base station, and determines, based on the resource configuration information, the time-frequency resource that is reallocated by the second base station to the first base station.

After the first base station determines the time-frequency resource reallocated by the second base station, the first base station sends the second indication information to the second base station. The second indication information indicates, to the terminal device, the time-frequency resource reallocated by the second base station to the first base station. When sending the second indication information to the terminal device, the first base station may use a system message, radio resource control (RRC) signaling, a MAC control element (MAC CE), or the like. This is not limited in this application.

After completing time-frequency resource reconfiguration based on the second indication information, the terminal device sends reconfiguration complete information to the first base station, and the first base station sends the reconfiguration complete information to the second base station, so that the second base station learns that the terminal device completes the time-frequency resource reconfiguration, and subsequently may communicate with the first base station according to a new resource configuration.

Alternatively, reconfiguration completion timers are separately configured for the first base station and the second base station. After the first base station sends the second indication information to the terminal device, regardless of whether the first base station receives reconfiguration complete information sent by the terminal device, once either of the timers expires, the first base station and the second base station communicate with each other according to a new resource configuration.

It should be noted that in the wireless communication method in this application, the first base station may be a gNB in a 5G NR system, and the second base station may be an eNB in an LTE system. However, this application is not limited thereto. For example, the first base station may be an eNB in the LTE system, and the second base station may be a gNB in the 5G NR system. Alternatively, both the first base station and the second base station are gNBs in the 5G NR system. Alternatively, both the first base station and the second base station are eNBs in the LTE system.

It should be further noted that in this application, the frame number corresponding to the frame or the subframe number corresponding to the subframe that is allocated by the second base station to the first base station is valid in N (N is greater than or equal to 1) consecutive frames or subframes. For example, when the time domain resource allocated by the second base station to the first base station is a frame 5, starting from the frame 5 of the first base station, all frames 5 in subsequent N frames or subframes are transmission resources allocated by the second base station to the first base station. This is not limited in this application.

Therefore, according to the wireless communication method in this application, when the terminal device cannot successfully sense a synchronization signal of the second base station, information is directly exchanged between the first base station and the second base station. In this way, alignment between the start locations of the time domain resources of the first base station and the second base station can be implemented. Therefore, the first base station can communicate with the terminal device by using the time-frequency resource allocated by the second base station without causing a resource conflict between the first base station and the second base station.

Figure 3:
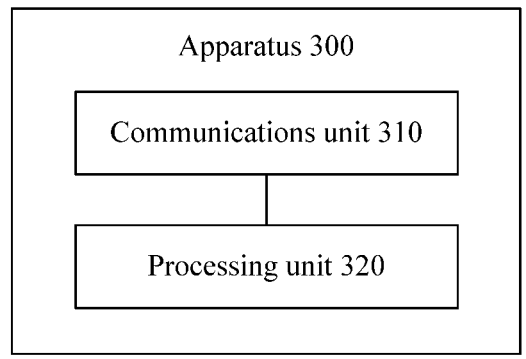
FIG. 3 is a schematic block diagram of a wireless communications apparatus according to this application.

FIG. 3 is a schematic block diagram of a wireless communications apparatus 300 according to this application. As shown in FIG. 3, the apparatus 300 is disposed in a communications system that includes at least two base stations, and the apparatus is disposed in a first base station in the at least two base stations. The first base station performs wireless communication by using a first frequency domain resource. A second base station in the at least two base stations performs wireless communication by using a second frequency domain resource. The first frequency domain resource does not overlap the second frequency domain resource. The apparatus includes a communications unit 310 and a processing unit 320.

The communications unit 310 is configured to send a resource request message to the second base station. The resource request message requests the second base station to allocate a time-frequency resource to the first base station.

The communications unit 310 is further configured to receive resource configuration information sent by the second base station. The resource configuration information is used to indicate a first time-frequency resource, and the first time-frequency resource belongs to the second frequency domain resource in frequency domain.

The processing unit 320 is configured to determine the first time-frequency resource based on the resource configuration information.

The communications unit 310 is further configured to communicate with a terminal device by using the first time-frequency resource.

Optionally, the resource configuration information is specifically used to indicate a sequence number of a first time unit corresponding to the first time-frequency resource. The first time unit includes M time units, where M≥1. The resource configuration information is further used to indicate a start location of at least one of the M time units in a time domain resource corresponding to the second base station.

The processing unit 320 is specifically configured to determine, based on a sequence number of the at least one time unit and the start location of the at least one time unit in the time domain resource corresponding to the second base station, a start location of the first time unit in a time domain resource corresponding to the first base station.

Optionally, the communications unit 310 is further configured to receive first resource reference information sent by the second base station. The first resource reference information is used to indicate a sequence number of a second time unit. The first resource reference information is further used to indicate a start location of the second time unit in the time domain resource corresponding to the second base station.

The processing unit 320 is specifically configured to determine, based on the sequence number of the second time unit and the start location of the second time unit in the time domain resource corresponding to the second base station, the start location of the first time unit in the time domain resource corresponding to the first base station.

Optionally, the communications unit 310 is specifically configured to send second resource reference information to the second base station. The second resource reference information is used to indicate a sequence number of a third time unit. The second resource reference information is further used to indicate a start location of the third time unit in the time domain resource corresponding to the first base station.

The communications unit 310 is specifically configured to receive third resource reference information sent by the second base station. The third resource reference information is used to indicate a start location offset. The start location offset is a time difference between the start location of the third time unit and a start location of a fourth time unit. The fourth time unit is a time unit in the time domain resource corresponding to the second base station.

The processing unit 320 is specifically configured to determine, based on the start location offset, the start location of the first time unit in the time domain resource corresponding to the first base station.

Optionally, the second resource reference information and the resource request message are same information, and/or the first resource reference information and the resource configuration information are same information, and/or the third resource reference information and the resource configuration information are same information.

Optionally, the first time unit is a frame, the sequence number of the first time unit is a frame number, the second time unit is a frame, the sequence number of the second time unit is a frame number, the third time unit is a frame, and the sequence number of the third time unit is a frame number.

Alternatively, the first time unit is a subframe, the sequence number of the first time unit is a subframe number, the second time unit is a subframe, the sequence number of the second time unit is a subframe number, the third time unit is a subframe, and the sequence number of the third time unit is a subframe number.

Optionally, the communications unit 310 is specifically configured to send first indication information to the terminal device. The first indication information is used to indicate the first time-frequency resource.

Optionally, the communications unit 310 is specifically configured to receive resource reconfiguration information sent by the second base station. The resource reconfiguration information is used to indicate a time-frequency resource that is reallocated by the second base station to the first base station.

The communications unit 310 is specifically configured to send second indication information to the terminal device. The second indication information is used to indicate the time-frequency resource that is reallocated by the second base station to the first base station.

Optionally, the first base station is a gNB in a 5G NR system, and the second base station is an eNB in an LTE system.

It should be noted that the apparatus 300 may be configured in the first base station in the at least two base stations. Alternatively, the apparatus is the first base station. This is not limited in this application.

It should be understood that the wireless communications apparatus 300 according to this application may correspond to the first base station in the method in this application. Units and modules in the wireless communications apparatus 300 and other operations and/or functions described above are separately used to implement a corresponding procedure performed by the first base station in the method 200. For brevity, details are not described herein again.

Therefore, according to the wireless communications apparatus in this application, when the terminal device cannot successfully sense a synchronization signal of the second base station, information is directly exchanged between the first base station and the second base station. In this way, alignment between the start locations of the time domain resources of the first base station and the second base station can be implemented. Therefore, the first base station can communicate with the terminal device by using the time-frequency resource allocated by the second base station without causing a resource conflict between the first base station and the second base station.

Figure 4:
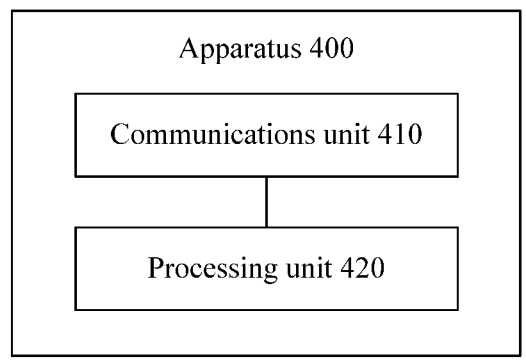
FIG. 4 is a schematic block diagram of a wireless communications apparatus according to this application.

FIG. 4 is a schematic block diagram of a wireless communications apparatus 400 according to this application. As shown in FIG. 4, the apparatus 400 is disposed in a communications system that includes at least two base stations, and the apparatus is disposed in a second base station in the at least two base stations. A first base station in the at least two base stations performs wireless communication by using a first frequency domain resource. The second base station performs wireless communication by using a second frequency domain resource. The first frequency domain resource does not overlap the second frequency domain resource. The apparatus includes a communications unit 410 and a processing unit 420.

The communications unit 410 is configured to receive a resource request message sent by the first base station. The resource request message requests the second base station to allocate a time-frequency resource to the first base station.

The processing unit 420 is configured to determine a first time-frequency resource based on the resource request message.

The communications unit 410 is further configured to send resource configuration information to the first base station. The resource configuration information is used to indicate the first time-frequency resource, and the first time-frequency resource belongs to the second frequency domain resource in frequency domain.

Optionally, the resource configuration information is specifically used to indicate a sequence number of a first time unit corresponding to the first time-frequency resource. The first time unit includes M time units, where M≥1. The resource configuration information is further used to indicate a start location of at least one of the M time units in a time domain resource corresponding to the second base station.

Optionally, the communications unit 410 is specifically configured to send first resource reference information to the first base station. The first resource reference information is used to indicate a sequence number of a second time unit. The first resource reference information is further used to indicate a start location of the second time unit in the time domain resource corresponding to the second base station.

Optionally, the communications unit 410 is specifically configured to receive second resource reference information sent by the first base station. The second resource reference information is used to indicate a sequence number of a third time unit. The second resource reference information is further used to indicate a start location of the third time unit in a time domain resource corresponding to the first base station.

The communications unit 410 is specifically configured to send third resource reference information to the second base station. The third resource reference information is used to indicate a start location offset. The start location offset is a time difference between the start location of the third time unit and a start location of a fourth time unit. The fourth time unit is a time unit in the time domain resource corresponding to the second base station.

Optionally, the second resource reference information and the resource request message are same information, and/or the first resource reference information and the resource configuration information are same information, and/or the third resource reference information and the resource configuration information are same information.

Optionally, the first time unit is a frame, the sequence number of the first time unit is a frame number, the second time unit is a frame, the sequence number of the second time unit is a frame number, the third time unit is a frame, and the sequence number of the third time unit is a frame number.

Alternatively, the first time unit is a subframe, the sequence number of the first time unit is a subframe number, the second time unit is a subframe, the sequence number of the second time unit is a subframe number, the third time unit is a subframe, and the sequence number of the third time unit is a subframe number.

Optionally, the communications unit 410 is specifically configured to send resource reconfiguration information to the first base station. The resource reconfiguration information is used to indicate a time-frequency resource that is reallocated by the second base station to the first base station.

Optionally, the first base station is a gNB in a 5G NR system, and the second base station is an eNB in an LTE system.

It should be noted that the apparatus 400 may be configured in the second base station in the at least two base stations. Alternatively, the apparatus is the second base station. This is not limited in this application.

It should be understood that the wireless communications apparatus 400 according to this application may correspond to the second base station in the method in this application. Units and modules in the wireless communications apparatus 400 and other operations and/or functions described above are separately used to implement a corresponding procedure performed by the second base station in the method 200. For brevity, details are not described herein again.

Therefore, according to the wireless communications apparatus in this application, when the terminal device cannot successfully sense a synchronization signal of the second base station, information is directly exchanged between the first base station and the second base station. In this way, alignment between the start locations of the time domain resources of the first base station and the second base station can be implemented. Therefore, the first base station can communicate with the terminal device by using the time-frequency resource allocated by the second base station without causing a resource conflict between the first base station and the second base station.

Figure 5:
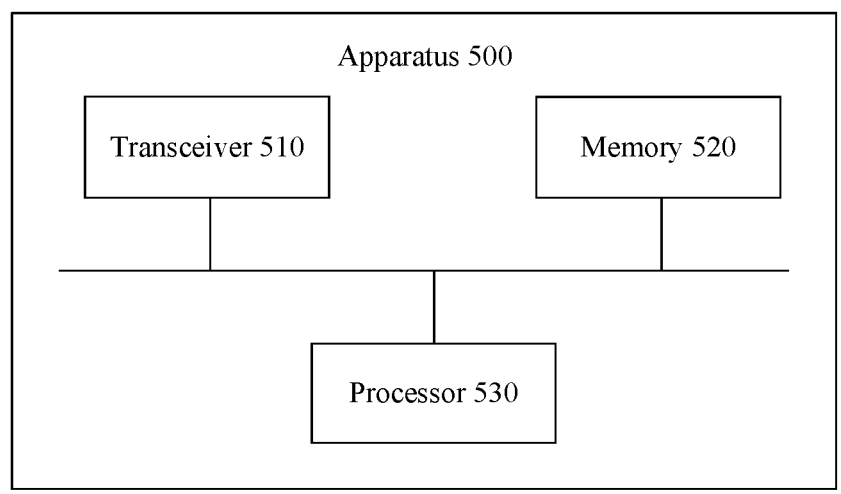
FIG. 5 is a schematic structural diagram of a wireless communications apparatus according to this application.

FIG. 5 is a schematic structural diagram of a wireless communications device 500 according to this application. As shown in FIG. 5, the device 500 is disposed in a communications system that includes at least two base stations, and the device is disposed in a first base station in the at least two base stations. The first base station performs wireless communication by using a first frequency domain resource. A second base station in the at least two base stations performs wireless communication by using a second frequency domain resource. The first frequency domain resource does not overlap the second frequency domain resource. The device 500 includes a transceiver 510, a memory 520, and a processor 530.

The memory 520 is configured to store an instruction. The processor 530 is configured to execute the instruction stored in the memory 520, so as to control the transceiver 510 to send a signal or control the transceiver 510 to receive a signal.

The transceiver 510 is configured to send a resource request message to the second base station. The resource request message requests the second base station to allocate a time-frequency resource to the first base station.

The transceiver 510 is configured to receive resource configuration information sent by the second base station. The resource configuration information is used to indicate a first time-frequency resource, and the first time-frequency resource belongs to the second frequency domain resource in frequency domain.

The processor 530 is configured to determine the first time-frequency resource based on the resource configuration information.

The transceiver 510 is further configured to communicate with a terminal device by using the first time-frequency resource.

Optionally, the resource configuration information is specifically used to indicate a sequence number of a first time unit corresponding to the first time-frequency resource. The first time unit includes M time units, where M≥1. The resource configuration information is further used to indicate a start location of at least one of the M time units in a time domain resource corresponding to the second base station.

The processor 530 is specifically configured to determine, based on a sequence number of the at least one time unit and the start location of the at least one time unit in the time domain resource corresponding to the second base station, a start location of the first time unit in a time domain resource corresponding to the first base station.

Optionally, the transceiver 510 is further configured to receive first resource reference information sent by the second base station. The first resource reference information is used to indicate a sequence number of a second time unit. The first resource reference information is further used to indicate a start location of the second time unit in the time domain resource corresponding to the second base station.

The processor 530 is specifically configured to determine, based on the sequence number of the second time unit and the start location of the second time unit in the time domain resource corresponding to the second base station, the start location of the first time unit in the time domain resource corresponding to the first base station.

Optionally, the transceiver 510 is specifically configured to send second resource reference information to the second base station. The second resource reference information is used to indicate a sequence number of a third time unit. The second resource reference information is further used to indicate a start location of the third time unit in the time domain resource corresponding to the first base station.

The transceiver 510 is specifically configured to receive third resource reference information sent by the second base station. The third resource reference information is used to indicate a start location offset. The start location offset is a time difference between the start location of the third time unit and a start location of a fourth time unit. The fourth time unit is a time unit in the time domain resource corresponding to the second base station.

The processor 530 is specifically configured to determine, based on the start location offset, the start location of the first time unit in the time domain resource corresponding to the first base station.

Optionally, the second resource reference information and the resource request message are same information, and/or the first resource reference information and the resource configuration information are same information, and/or the third resource reference information and the resource configuration information are same information.

Optionally, the first time unit is a frame, the sequence number of the first time unit is a frame number, the second time unit is a frame, the sequence number of the second time unit is a frame number, the third time unit is a frame, and the sequence number of the third time unit is a frame number.

Alternatively, the first time unit is a subframe, the sequence number of the first time unit is a subframe number, the second time unit is a subframe, the sequence number of the second time unit is a subframe number, the third time unit is a subframe, and the sequence number of the third time unit is a subframe number.

Optionally, the transceiver 510 is specifically configured to send first indication information to the terminal device. The first indication information is used to indicate the first time-frequency resource.

Optionally, the transceiver 510 is specifically configured to receive resource reconfiguration information sent by the second base station. The resource reconfiguration information is used to indicate a time-frequency resource that is reallocated by the second base station to the first base station.

The transceiver 510 is specifically configured to send second indication information to the terminal device. The second indication information is used to indicate the time-frequency resource that is reallocated by the second base station to the first base station.

Optionally, the first base station is a gNB in a 5G NR system, and the second base station is an eNB in an LTE system.

It should be noted that the device 500 may be configured in the first base station in the at least two base stations. Alternatively, the apparatus is the first base station. This is not limited in this application.

It should be understood that in this application, the processor 530 may be a central processing unit (CPU), or the processor 530 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory 520 may include a read-only memory and a random access memory, and provide an instruction and data to the processor 530. A part of the memory 520 may further include a nonvolatile random access memory. For example, the memory 520 may further store information of a device type.

In an implementation process, steps in the foregoing method can be implemented by using a hardware integrated logical circuit in the processor 530, or by using instructions in a form of software. The steps of the method disclosed with reference to this application may be directly implemented by a hardware processor, or may be implemented by a combination of hardware and a software module in a processor. The software module may be located in a mature storage medium in the art, such as a random access memory, a flash memory, a read-only memory, a programmable read-only memory, an electrically erasable programmable memory, a register, or the like. The storage medium is located in the memory 520, and the processor 530 reads information in the memory 520 and completes the steps in the foregoing method in combination with hardware of the processor. To avoid repetition, details are not described herein again.

It should be understood that the wireless communications device 500 according to this application may correspond to the first base station in the method in this application. Units and modules in the wireless communications device 500 and other operations and/or functions described above are separately used to implement a corresponding procedure performed by the first base station in the method 200. For brevity, details are not described herein again.

Therefore, according to the wireless communications device in this application, when the terminal device cannot successfully sense a synchronization signal of the second base station, information is directly exchanged between the first base station and the second base station. In this way, alignment between the start locations of the time domain resources of the first base station and the second base station can be implemented. Therefore, the first base station can communicate with the terminal device by using the time-frequency resource allocated by the second base station without causing a resource conflict between the first base station and the second base station.

Figure 6:
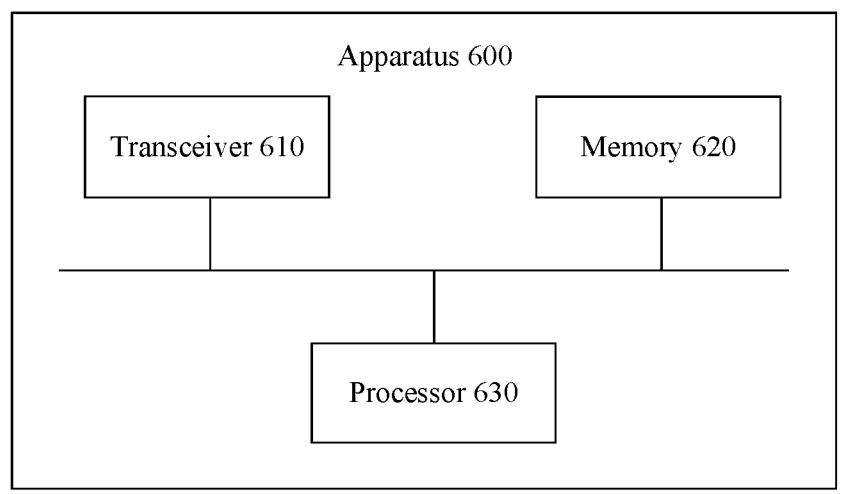
FIG. 6 is a schematic structural diagram of a wireless communications apparatus according to this application.

FIG. 6 is a schematic diagram of a wireless communications device 600 according to this application. As shown in FIG. 6, the device 600 is disposed in a communications system that includes at least two base stations, and the device is disposed in a second base station in the at least two base stations. A first base station in the at least two base stations performs wireless communication by using a first frequency domain resource. The second base station performs wireless communication by using a second frequency domain resource. The first frequency domain resource does not overlap the second frequency domain resource. The device includes a transceiver 610, a memory 620, and a processor 630.

The memory 620 is configured to store an instruction. The processor 630 is configured to execute the instruction stored in the memory 620, so as to control the transceiver 610 to send a signal or control the transceiver 610 to receive a signal.

The transceiver 610 is configured to receive a resource request message sent by the first base station. The resource request message requests the second base station to allocate a time-frequency resource to the first base station.

The processor 630 is configured to determine a first time-frequency resource based on the resource request message.

The transceiver 610 is further configured to send resource configuration information to the first base station. The resource configuration information is used to indicate the first time-frequency resource, and the first time-frequency resource belongs to the second frequency domain resource in frequency domain.

Optionally, the resource configuration information is specifically used to indicate a sequence number of a first time unit corresponding to the first time-frequency resource. The first time unit includes M time units, where M≥1. The resource configuration information is further used to indicate a start location of at least one of the M time units in a time domain resource corresponding to the second base station.

Optionally, the transceiver 610 is specifically configured to send first resource reference information to the first base station. The first resource reference information is used to indicate a sequence number of a second time unit. The first resource reference information is further used to indicate a start location of the second time unit in the time domain resource corresponding to the second base station.

Optionally, the transceiver 610 is specifically configured to receive second resource reference information sent by the first base station. The second resource reference information is used to indicate a sequence number of a third time unit. The second resource reference information is further used to indicate a start location of the third time unit in a time domain resource corresponding to the first base station.

The transceiver 610 is specifically configured to send third resource reference information to the second base station. The third resource reference information is used to indicate a start location offset. The start location offset is a time difference between the start location of the third time unit and a start location of a fourth time unit. The fourth time unit is a time unit in the time domain resource corresponding to the second base station.

Optionally, the second resource reference information and the resource request message are same information, and/or the first resource reference information and the resource configuration information are same information, and/or the third resource reference information and the resource configuration information are same information.

Optionally, the first time unit is a frame, the sequence number of the first time unit is a frame number, the second time unit is a frame, the sequence number of the second time unit is a frame number, the third time unit is a frame, and the sequence number of the third time unit is a frame number.

Alternatively, the first time unit is a subframe, the sequence number of the first time unit is a subframe number, the second time unit is a subframe, the sequence number of the second time unit is a subframe number, the third time unit is a subframe, and the sequence number of the third time unit is a subframe number.

Optionally, the transceiver 610 is specifically configured to send resource reconfiguration information to the first base station. The resource reconfiguration information is used to indicate a time-frequency resource that is reallocated by the second base station to the first base station.

Optionally, the first base station is a gNB in a 5G NR system, and the second base station is an eNB in an LTE system.

It should be noted that the device 600 may be configured in the second base station in the at least two base stations. Alternatively, the apparatus is the second base station. This is not limited in this application.

It should be understood that in this application, the processor 630 may be a central processing unit (CPU), or the processor 630 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory 620 may include a read-only memory and a random access memory, and provide an instruction and data to the processor 630. A part of the memory 620 may further include a nonvolatile random access memory. For example, the memory 620 may further store information of a device type.

In an implementation process, steps in the foregoing method can be implemented by using a hardware integrated logical circuit in the processor 630, or by using instructions in a form of software. The steps of the method disclosed with reference to this application may be directly implemented by a hardware processor, or may be implemented by a combination of hardware and a software module in a processor. The software module may be located in a mature storage medium in the art, such as a random access memory, a flash memory, a read-only memory, a programmable read-only memory, an electrically erasable programmable memory, a register, or the like. The storage medium is located in the memory 620, and the processor 630 reads information in the memory 620 and completes the steps in the foregoing method in combination with hardware of the processor. To avoid repetition, details are not described herein again.

It should be understood that the wireless communications device 600 according to this application may correspond to the second base station in the method in this application. Units and modules in the wireless communications device 600 and other operations and/or functions described above are separately used to implement a corresponding procedure performed by the second base station in the method 200. For brevity, details are not described herein again.

Therefore, according to the wireless communications device in this application, when the terminal device cannot successfully sense a synchronization signal of the second base station, information is directly exchanged between the first base station and the second base station. In this way, alignment between the start locations of the time domain resources of the first base station and the second base station can be implemented. Therefore, the first base station can communicate with the terminal device by using the time-frequency resource allocated by the second base station without causing a resource conflict between the first base station and the second base station.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
   sending, by a first base station in a communications system comprising at least two base stations, a resource request message to a second base station in the communications system, wherein the resource request message requests the second base station to allocate a time-frequency resource to the first base station, wherein the first base station performs wireless communication using a first frequency domain resource, wherein the second base station performs wireless communication using a second frequency domain resource, and wherein the first frequency domain resource does not overlap the second frequency domain resource;
   receiving resource configuration information from the second base station, wherein the resource configuration information indicates a first time-frequency resource, and the first time-frequency resource belongs to the second frequency domain resource in a frequency domain;
   determining the first time-frequency resource according to the resource configuration information; and
   communicating with a terminal device using the first time-frequency resource.

2. The method according to claim 1, wherein the resource configuration information indicates a sequence number of a first time unit corresponding to the first time-frequency resource, wherein the first time unit comprises M time units, wherein M≥1, and wherein the resource configuration information further indicates a start location of at least one of the M time units in a time domain resource corresponding to the second base station; and
   wherein the determining the first time-frequency resource comprises:
      determining, according to a sequence number of the at least one time unit and the start location of the at least one time unit in the time domain resource corresponding to the second base station, a start location of the first time unit in a time domain resource corresponding to the first base station.

3. The method according to claim 2, wherein the determining the first time-frequency resource comprises:
   sending second resource reference information to the second base station, wherein the second resource reference information indicates a sequence number of a third time unit and a start location of the third time unit in the time domain resource corresponding to the first base station;
   receiving third resource reference information from the second base station, wherein the third resource reference information indicates a start location offset, wherein the start location offset is a time difference between the start location of the third time unit and a start location of a fourth time unit, and wherein the fourth time unit is a time unit in the time domain resource corresponding to the second base station; and
   determining, according to the start location offset, the start location of the first time unit in the time domain resource corresponding to the first base station.

4. The method according to claim 2, wherein the method further comprises:
   receiving first resource reference information from the second base station, wherein the first resource reference information indicates a sequence number of a second time unit and a start location of the second time unit in the time domain resource corresponding to the second base station; and
   wherein the determining the first time-frequency resource comprises:
      determining, according to the sequence number of the second time unit and the start location of the second time unit in the time domain resource corresponding to the second base station, the start location of the first time unit in the time domain resource corresponding to the first base station.

5. The method according to claim 1, wherein the method further comprises:
   sending first indication information to the terminal device, wherein the first indication information indicates the first time-frequency resource.

6. A first base station, comprising:
   a processor; and
   a non-transitory computer-readable storage medium storing a program to be executed by the processor, the program including instructions to:
      send a resource request message to a second base station in a communications system comprising at least two base stations including the first base station and the second base station, wherein the resource request message is used to request the second base station to allocate a time-frequency resource to the first base station, wherein the first base station performs wireless communication using a first frequency domain resource, wherein a second base station in the communications system performs wireless communication using a second frequency domain resource, and wherein the first frequency domain resource does not overlap the second frequency domain resource;
      receive resource configuration information from the second base station, wherein the resource configuration information indicates a first time-frequency resource, and the first time-frequency resource belongs to the second frequency domain resource in frequency domain;
      determine the first time-frequency resource according to the resource configuration information; and
      communicate with a terminal device by using the first time-frequency resource.

7. The first base station according to claim 6, wherein the resource configuration information indicates a sequence number of a first time unit corresponding to the first time-frequency resource, wherein the first time unit comprises M time units, wherein M≥1, and wherein the resource configuration information further indicates a start location of at least one of the M time units in a time domain resource corresponding to the second base station; and
   wherein the program further includes instructions to:
      determine, according to a sequence number of the at least one time unit and the start location of the at least one time unit in the time domain resource corresponding to the second base station, a start location of the first time unit in a time domain resource corresponding to the first base station.

8. The first base station according to claim 7, wherein the program further include instructions to:
receive first resource reference information from the second base station, wherein the first resource reference information indicates a sequence number of a second time unit and a start location of the second time unit in the time domain resource corresponding to the second base station; and
determine, according to the sequence number of the second time unit and the start location of the second time unit in the time domain resource corresponding to the second base station, the start location of the first time unit in the time domain resource corresponding to the first base station.

9. The first base station according to claim 8, wherein the program further includes instructions to:
send second resource reference information to the second base station, wherein the second resource reference information indicates a sequence number of a third time unit and a start location of the third time unit in the time domain resource corresponding to the first base station;
receive third resource reference information from the second base station, wherein the third resource reference information indicates a start location offset, wherein the start location offset is a time difference between the start location of the third time unit and a start location of a fourth time unit, and wherein the fourth time unit is a time unit in the time domain resource corresponding to the second base station; and
determine, according to the start location offset, the start location of the first time unit in the time domain resource corresponding to the first base station.

10. The first base station according to claim 9, wherein at least one of:
the second resource reference information and the resource request message are same information; or
the first resource reference information and the resource configuration information are same information; or
the third resource reference information and the resource configuration information are same information.

11. The first base station according to claim 10, wherein at least one of:
the first time unit is a frame, the sequence number of the first time unit is a frame number, the second time unit is a frame, the sequence number of the second time unit is a frame number, the third time unit is a frame, and the sequence number of the third time unit is a frame number; or
the first time unit is a subframe, the sequence number of the first time unit is a subframe number, the second time unit is a subframe, the sequence number of the second time unit is a subframe number, the third time unit is a subframe, and the sequence number of the third time unit is a subframe number.

12. The first base station according to claim 6, wherein the program further includes instructions to:
send first indication information to the terminal device, wherein the first indication information indicates the first time-frequency resource.

13. The first base station according to claim 6, wherein the program further includes instructions to:
receive resource reconfiguration information from the second base station, wherein the resource reconfiguration information indicates a time-frequency resource that is reallocated by the second base station to the first base station; and
send second indication information to the terminal device, wherein the second indication information indicates the time-frequency resource that is reallocated by the second base station to the first base station.

14. A second base station, comprising:
a processor; and
a non-transitory computer-readable storage medium storing a program to be executed by the processor, the program including instructions to:
receive a resource request message from a first base station in a communications system comprising at least two base stations including the first base station and the second base station, wherein the resource request message requests the second base station to allocate a time-frequency resource to the first base station, wherein the first base station in the communications system performs wireless communication using a first frequency domain resource, wherein the second base station performs wireless communication using a second frequency domain resource, and wherein the first frequency domain resource does not overlap the second frequency domain resource;
determine a first time-frequency resource according to the resource request message; and
send resource configuration information to the first base station, wherein the resource configuration information indicates the first time-frequency resource, and wherein the first time-frequency resource belongs to the second frequency domain resource in frequency domain.

15. The second base station according to claim 14, wherein the resource configuration information indicates a sequence number of a first time unit corresponding to the first time-frequency resource, wherein the first time unit comprises M time units, wherein M≥1, and wherein the resource configuration information further indicates a start location of at least one of the M time units in a time domain resource corresponding to the second base station.

16. The second base station according to claim 15, wherein the program further includes instructions to:
send first resource reference information to the first base station, wherein the first resource reference information indicates a sequence number of a second time unit and a start location of the second time unit in the time domain resource corresponding to the second base station.

17. The second base station according to claim 16, wherein the program further includes instructions to:
receive second resource reference information from the first base station, wherein the second resource reference information indicates a sequence number of a third time unit and a start location of the third time unit in a time domain resource corresponding to the first base station; and
send third resource reference information to the first base station, wherein the third resource reference information indicates a start location offset, wherein the start location offset is a time difference between the start location of the third time unit and a start location of a fourth time unit, and wherein the fourth time unit is a time unit in the time domain resource corresponding to the second base station.

18. The second base station according to claim 17, wherein at least one of:
the second resource reference information and the resource request message are same information; or
the first resource reference information and the resource configuration information are same information; or
the third resource reference information and the resource configuration information are same information.

19. The second base station according to claim 18, wherein at least one of:
the first time unit is a frame, the sequence number of the first time unit is a frame number, the second time unit is a frame, the sequence number of the second time unit is a frame number, the third time unit is a frame, and the sequence number of the third time unit is a frame number; or
the first time unit is a subframe, the sequence number of the first time unit is a subframe number, the second time unit is a subframe, the sequence number of the second time unit is a subframe number, the third time unit is a subframe, and the sequence number of the third time unit is a subframe number.

20. The second base station according to claim 14, wherein the program further includes instructions to:
send resource reconfiguration information to the first base station, wherein the resource reconfiguration information indicates a time-frequency resource that is reallocated by the second base station to the first base station.

* * * * *